(12) United States Patent
Toba (10) Patent No.: US 7,665,323 B2
(45) Date of Patent: Feb. 23, 2010

(54) AIR CONDITIONING UNIT FOR VEHICLES

(75) Inventor: Yuji Toba, Hadano (JP)

(73) Assignee: Keihin Corporation, Tokyo (JP)

( * ) Notice: Subject to any disclaimer, the term of this patent is extended or adjusted under 35 U.S.C. 154(b) by 293 days.

(21) Appl. No.: 11/524,158

(22) Filed: Sep. 20, 2006

(65) Prior Publication Data

US 2007/0062208 A1    Mar. 22, 2007

(30) Foreign Application Priority Data

Sep. 20, 2005   (JP)   ............................. 2005-271868

(51) Int. Cl.
*F25D 21/14* (2006.01)
*B60H 1/32* (2006.01)

(52) U.S. Cl. .............................. 62/288; 62/285; 62/239

(58) Field of Classification Search ................... 62/239, 62/285, 288, 289; 165/41, 42, 43, 202; 261/153; 454/69, 157; 237/12.3 A, 12.3 B
See application file for complete search history.

(56) References Cited

U.S. PATENT DOCUMENTS

| 2,133,354 | A | * | 10/1938 | Krackowizer | 62/290 |
| 2,263,476 | A | * | 11/1941 | Sunday | 165/43 |
| 3,351,129 | A | * | 11/1967 | Spatt | 165/202 |
| 4,000,779 | A | * | 1/1977 | Irwin | 165/111 |
| 4,385,505 | A | * | 5/1983 | Umezu et al. | 62/285 |
| 4,516,921 | A | * | 5/1985 | Kemp | 418/141 |
| 4,940,083 | A | * | 7/1990 | Takenaka et al. | 165/42 |
| 5,118,038 | A | * | 6/1992 | Shimizu et al. | 237/2 A |
| 5,737,936 | A |   | 4/1998 | Takasaki |  |
| 5,862,677 | A | * | 1/1999 | Kim et al. | 62/244 |
| 5,875,592 | A | * | 3/1999 | Allman et al. | 52/90.2 |
| 5,878,591 | A | * | 3/1999 | Tsuji et al. | 62/285 |
| 6,062,032 | A | * | 5/2000 | Yoon | 62/285 |

(Continued)

FOREIGN PATENT DOCUMENTS

JP        9-175157        7/1997

(Continued)

OTHER PUBLICATIONS

Japanese Office Action for Application No. 2005-271868, dated Apr. 21, 2009, Abstr.

*Primary Examiner*—Frantz F Jules
*Assistant Examiner*—Alexis K Cox
(74) *Attorney, Agent, or Firm*—Lahive & Cockfield, LLP; Anthony A. Laurentano (57) ABSTRACT

A first casing includes a first baffle plate, and a second casing includes a second baffle plate. The second baffle plate is contiguous to a guide rib, which is disposed underneath the second baffle plate, having a horizontal side wall and a slanted side wall. A slit is defined between the horizontal side wall and the slanted side wall, wherein the slit extends to an end face of a partition wall. When the first casing and the second casing are connected to each other, the first baffle plate is slidably inserted in the slit. The first baffle plate projects slightly from the slit into a liquid reservoir chamber, by a distance that is not large enough to increase air resistance with respect to air flowing in the vehicular air conditioning unit. An expansion valve is sandwiched between the first baffle plate and the second baffle plate.

10 Claims, 8 Drawing Sheets

U.S. PATENT DOCUMENTS

| | | | |
|---|---|---|---|
| 6,138,749 A * | 10/2000 | Kawai et al. | 165/204 |
| 6,431,257 B1 * | 8/2002 | Sano et al. | 165/42 |
| 6,609,563 B1 * | 8/2003 | Tsurushima et al. | 165/204 |
| 6,886,630 B2 * | 5/2005 | Onda et al. | 165/202 |
| 7,210,305 B2 * | 5/2007 | Shin | 62/285 |
| 7,407,001 B2 * | 8/2008 | Newman et al. | 165/202 |
| 7,543,598 B1 * | 6/2009 | Hygema | 137/216 |
| 2001/0017038 A1 * | 8/2001 | Aoki | 62/239 |
| 2002/0121557 A1 * | 9/2002 | Kaneura et al. | 237/12.3 A |
| 2002/0144513 A1 * | 10/2002 | Gunji et al. | 62/263 |
| 2003/0006033 A1 * | 1/2003 | Kawada et al. | 165/202 |
| 2004/0011502 A1 * | 1/2004 | Sugano | 165/41 |
| 2004/0069480 A1 * | 4/2004 | Yamamoto et al. | 165/202 |
| 2004/0237561 A1 * | 12/2004 | Duarte Barreto Junior | 62/285 |
| 2005/0138945 A1 * | 6/2005 | Schurig et al. | 62/279 |

FOREIGN PATENT DOCUMENTS

| | | |
|---|---|---|
| JP | 09193648 A * | 7/1997 |
| JP | 09-303905 | 11/1997 |
| JP | 2001-277841 | 10/2001 |
| JP | 2003-127651 | 5/2003 |
| JP | 2004-098755 | 4/2004 |
| JP | 2004-345589 | 12/2004 |

* cited by examiner

AIR CONDITIONING UNIT FOR VEHICLES

BACKGROUND OF THE INVENTION

1. Field of the Invention

The present invention relates to a vehicular air conditioning unit for use in automobiles, and more particularly to a vehicular air conditioning unit having a guiding structure, for guiding liquid droplets produced in the vicinity of an expansion valve due to moisture condensation.

2. Description of the Related Art

Automobiles have a passenger compartment for accommodating passengers on board. When a passenger in the passenger compartment feels hot, the passenger may control a cooling mechanism mounted in the automobile, in order to adjust the temperature inside the passenger compartment.

The cooling mechanism includes a compressor, a condenser, a receiver, an expansion valve, and an evaporator, which are connected by piping. A refrigerant circulates through the pipes between the components of the cooling mechanism. Specifically, the refrigerant is compressed by the compressor and then condensed into a liquid form by the condenser. The liquid refrigerant flows through the receiver into the expansion valve. When the liquid refrigerant is ejected from the expansion valve, the refrigerant is quickly expanded into a mist, which is delivered to the evaporator.

The evaporator is supplied with air from the passenger compartment. The refrigerant that flows inside the evaporator deprives the air of heat of evaporation, thus lowering the temperature of the air. At the same time, the refrigerant is evaporated in the evaporator. The evaporated refrigerant then returns to the compressor, which again compresses the refrigerant. The above cycle of operation is repeated in order to continuously cool the passenger compartment.

When the refrigerant mist is ejected from the expansion valve into the evaporator, the refrigerant undergoes adiabatic expansion, thereby lowering the temperature of the expansion valve in the vicinity of the ejection port, as well as the temperature of the pipe that is connected to the ejection port. If the temperature drops significantly, to the dew point or lower, then dew condensation occurs on outer surfaces of the expansion valve and the pipe. If liquid droplets produced by such dew condensation enter into the passenger compartment, then passengers in the passenger compartment may become wet. Entry of excessive liquid droplets into the passenger compartment may possibly cause some of the liquid droplets to reach a CPU, which is positioned near the feet of the passenger in the passenger compartment. Since the CPU could be adversely affected by such liquid droplets, it is necessary to minimize entry of liquid droplets from the cooling mechanism into the passenger compartment.

One widely practiced approach is to wind an insulator, made of an ethylene propylene copolymer or the like, around the expansion valve and nearby piping, thereby suppressing the formation of dew condensation thereon (for details, see Japanese Laid-Open Patent Publication No. 9-303905, for example).

However, in practice, it has proven difficult to sufficiently reduce dew condensation simply by winding an insulator around the expansion valve and nearby piping. Stated otherwise, it is not easy to install an insulator to the extent necessary for reducing dew condensation, unless a skilled worker is called in to do the job. In addition, the process of winding the insulator is complex and takes a long time to complete. Further, since an insulator is needed in the first place, the number of parts used is relatively large, thus increasing the cost of the cooling mechanism.

Japanese Laid-Open Patent Publication No. 2004-98755 discloses a vehicular air conditioning unit, including an expansion valve housed in an expansion valve chamber having a water removal hole for discharging liquid droplets. It is described in this publication that, even when dew condensation occurs in the expansion valve and nearby piping, formed liquid droplets are smoothly discharged from the expansion valve chamber and out of the casing of the vehicular air conditioning unit.

SUMMARY OF THE INVENTION

It is a general object of the present invention to provide a vehicular air conditioning unit, which does not require winding of an insulator around a pipe disposed near the expansion valve, and hence which is less costly to manufacture.

Another object of the present invention is to provide a vehicular air conditioning unit, which is capable of easily guiding and discharging liquid droplets that are produced due to dew condensation on pipes located near the expansion valve.

According to an aspect of the present invention, there is provided a vehicular air conditioning unit mounted in an automobile, for adjusting the temperature of air in a passenger compartment of the automobile, comprising an evaporator, an expansion valve connected to the evaporator by pipes, a first casing accommodating the evaporator therein and having a first baffle plate, and a second casing having a second baffle plate disposed in a position that faces the first baffle plate when the second casing is connected to the first casing, the first casing having a guide groove defined therein for slidable insertion of the second baffle plate therein, wherein, when the second casing is connected to the first casing, the second baffle plate is slidably inserted in the guide groove, and the expansion valve is encircled by the first baffle plate and the second baffle plate, and wherein, when dew condensation occurs on the pipes, liquid droplets produced on the pipes are blocked by the first baffle plate and the second baffle plate, and the liquid droplets are caused to pass through the guide groove.

According to another aspect of the present invention, there is provided a vehicular air conditioning unit mounted in an automobile, for adjusting the temperature of air in a passenger compartment of the automobile, comprising an evaporator, an expansion valve connected to the evaporator by pipes, a first casing accommodating the evaporator therein and having a first baffle plate, and a second casing having a second baffle plate disposed in a position that faces the first baffle plate when the second casing is connected to the first casing, the second casing having a guide groove defined therein for slidable insertion of the first baffle plate therein, wherein, when the second casing is connected to the first casing, the first baffle plate is slidably inserted in the guide groove and the expansion valve is encircled by the first baffle plate and the second baffle plate, and wherein, when dew condensation occurs on the pipes, liquid droplets produced on the pipes are blocked by the first baffle plate and the second baffle plate, and the liquid droplets are caused to pass through the guide groove.

According to the present invention, the expansion valve is encircled by the first baffle plate and the second baffle plate of the first casing and the second casing, respectively. When dew condensation occurs on the expansion valve and the pipes, liquid droplets produced thereon are blocked by the first baffle plate and the second baffle plate, and finally the liquid droplets are discharged from the guide groove. The liquid droplets can easily be guided and discharged without entering the passenger compartment.

According to the present invention, furthermore, dew condensation on the pipes can be prevented without winding an insulator around the pipes that interconnect the evaporator and the expansion valve. Even when dew condensation occurs on the pipes, the liquid droplets are blocked and trapped efficiently. Consequently, a complex winding process, for winding the insulator around the pipes, is not required, allowing the vehicular air conditioning unit to be manufactured efficiently. Since an insulator is not required, the number of parts used is relatively small, and the vehicular air conditioning unit can be manufactured at a relatively low cost.

Preferably, an upstanding guide rib should be disposed near an opening of the guide groove, for guiding the liquid droplets toward the guide groove, wherein the guide rib has two walls held in abutment against respective end faces of the first baffle plate and the second baffle plate, while gripping one of the first baffle plate and the second baffle plate. The guide rib is effective to guide the liquid droplets easily toward the guide groove.

One of the two walls of the guide rib should preferably be shorter than the other, and the guide groove should preferably have an increased width at an end of the shorter wall. With this arrangement, the liquid droplets can pass more reliably through the guide groove.

Preferably, either one of the first baffle plate and the second baffle plate should have a distal end that projects from the guide groove. The projecting distal end makes it highly difficult for the liquid droplets, which are blocked by end faces of the first baffle plate and the second baffle plate, to move beyond the distal end of the first baffle plate or the second baffle plate that projects from the guide groove and toward the other end face thereof. Stated otherwise, the liquid droplets can pass more reliably through the guide groove.

The distance at which the distal end projects from the guide groove should be small enough so as not to prevent air from flowing in the vehicular air conditioning unit, or in other words, so as not to increase air resistance with respect to air flowing in the vehicular air conditioning unit.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A vehicular air conditioning unit according to a preferred embodiment of the present invention shall be described in detail below with reference to the accompanying drawings.

Figure 1:
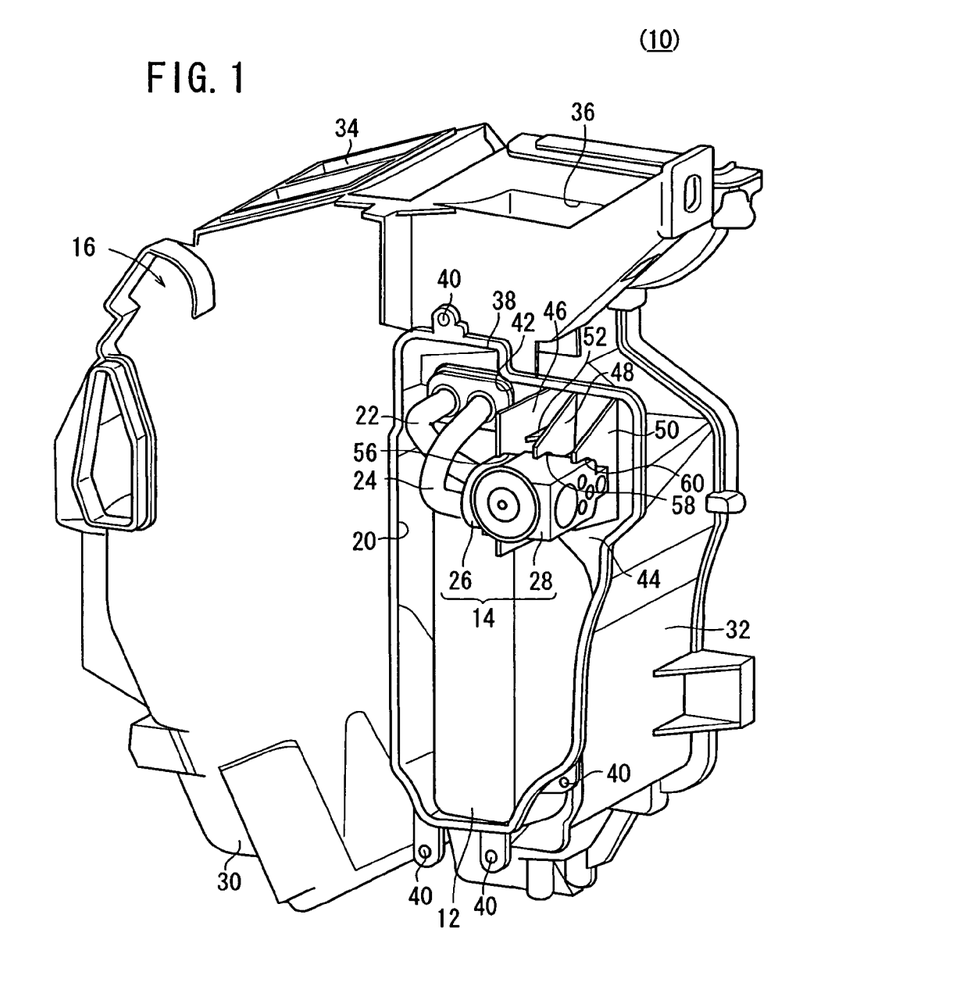
FIG. 1 is a perspective view of an evaporator, an expansion valve, and a first casing of a vehicular air conditioning unit according to an embodiment of the present invention.
Figure 2:
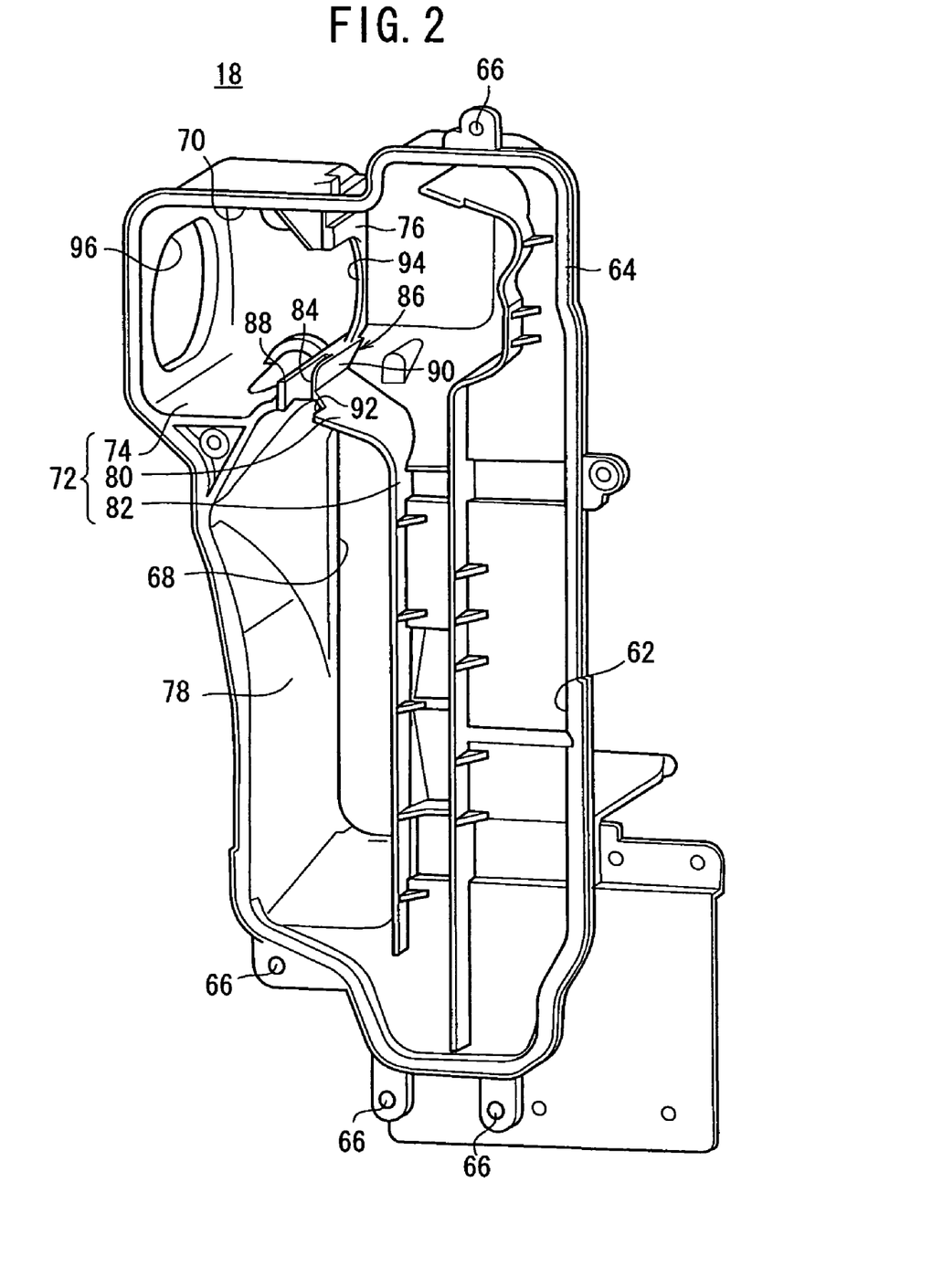
FIG. 2 is a perspective view of a second casing, which is to be connected to the first casing shown in FIG. 1.

FIG. 1 shows in perspective an evaporator 12, an expansion valve 14, and a first casing 16 of a vehicular air conditioning unit 10 according to an embodiment of the present invention, whereas FIG. 2 shows in perspective a second casing 18 to be connected to the first casing 16. In FIG. 2, a surface (inner surface) of the second casing 18 is shown, which covers the evaporator 12 and the expansion valve 14 in facing relation to the first casing 16. The vehicular air conditioning unit 10 is mounted in an automobile (not shown), having a passenger compartment that is to be air conditioned by the vehicular air conditioning unit 10.

Figure 3:
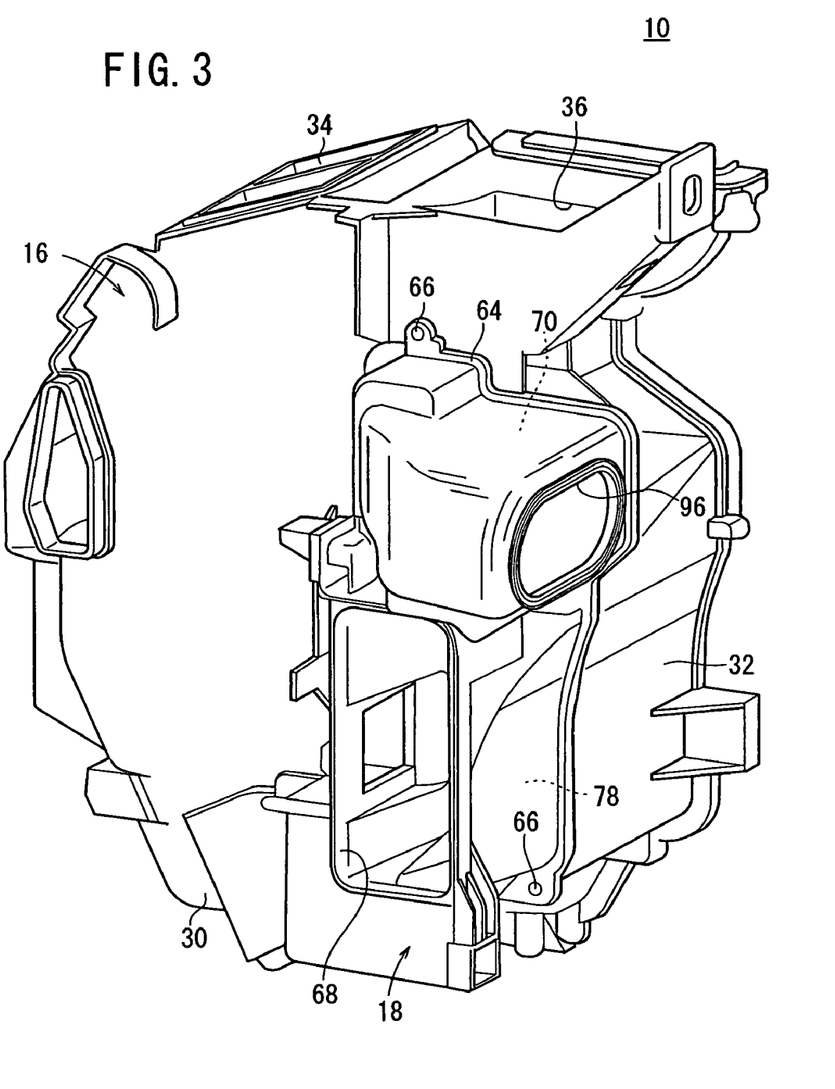
FIG. 3 is a perspective view of a connected assembly made up of the first casing shown in FIG. 1 and the second casing shown in FIG. 2.
Figure 4:
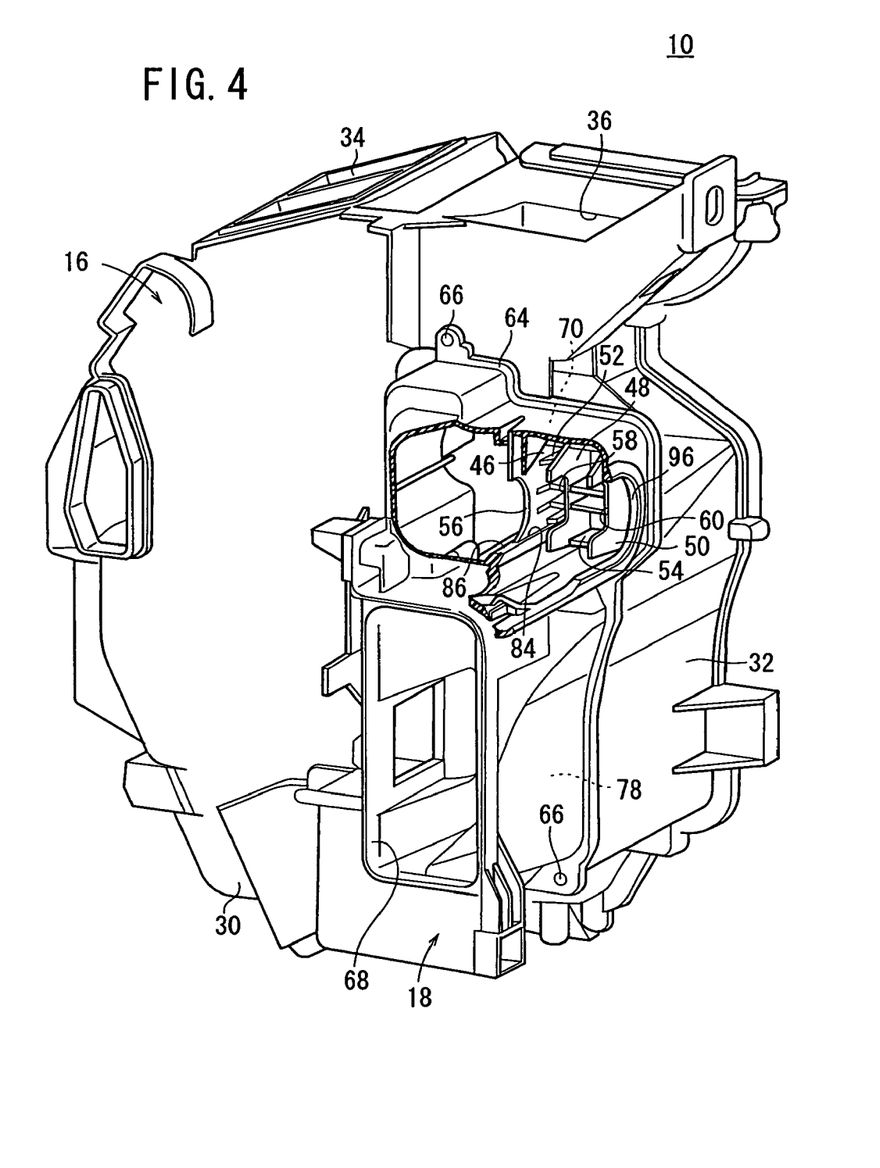
FIG. 4 is a perspective view, partly cut away, of the connected assembly.

As shown in FIGS. 3 and 4, the second casing 18 is connected to the first casing 16, in covering relation to an opening 20 of the first casing 16, thereby completing the vehicular air conditioning unit 10. In FIG. 4, the second casing 18 is shown, partly cut away, wherein, in order to clearly show the engagement between the first casing 16 and the second casing 18, the evaporator 12 and the expansion valve 14 have been omitted from illustration.

The evaporator 12 (see FIG. 1) includes a tube (not shown), which is bent in a plurality of turns extending back and forth from one end to the other of the evaporator 12. A refrigerant flows through a refrigerant passage defined in the tube.

The expansion valve 14 is disposed upstream of the evaporator 12 with respect to the direction in which the refrigerant flows. In other words, the refrigerant flows through the expansion valve 14 toward the evaporator 12. The expansion valve 14 is connected to the evaporator 12 through a low-pressure pipe 22 and a high-pressure pipe 24.

The expansion valve 14 includes a cylindrically shaped downstream joint 26 disposed near the low-pressure pipe 22 and the high-pressure pipe 24, the downstream joint 26 having a horizontally elongate elliptical bottom. The expansion valve 14 also includes an upstream joint 28 having a substantially prismatic shape, which is slightly wider than the downstream joint 26.

The first casing 16 has a cup-shaped member 30 with a substantially semicircular arcuate side wall, and an evaporator housing 32 accommodating the evaporator 12 therein. The first casing 16 also includes outlet ports 34, 36, defined respectively in an upper portion of the side wall of the cup-shaped member 30, and in an upper end of the evaporator housing 32. The outlet ports 34, 36 are positioned closely to each other, opening into the passenger compartment.

As shown in FIG. 1, the evaporator housing 32 has a front wall with an opening 20 defined therein, wherein the evaporator 12 housed in the evaporator housing 32 can be seen through the opening 20. The low-pressure pipe 22, the high-pressure pipe 24, and the expansion valve 14 project from the opening 20. The evaporator housing 32 includes a fastening rib 38 having a predetermined thickness that extends around the opening 20. The fastening rib 38 includes a plurality of bolt holes 40 defined therein at spaced intervals.

A step 42 is disposed at a substantially central area of an upper portion of the opening 20. Therefore, as shown in FIG. 1, the upper portion of the opening 20 has a reduced vertical dimension on the right side thereof. The horizontal dimension, or width, of the opening 20 is progressively smaller in a downward direction.

Figure 5:
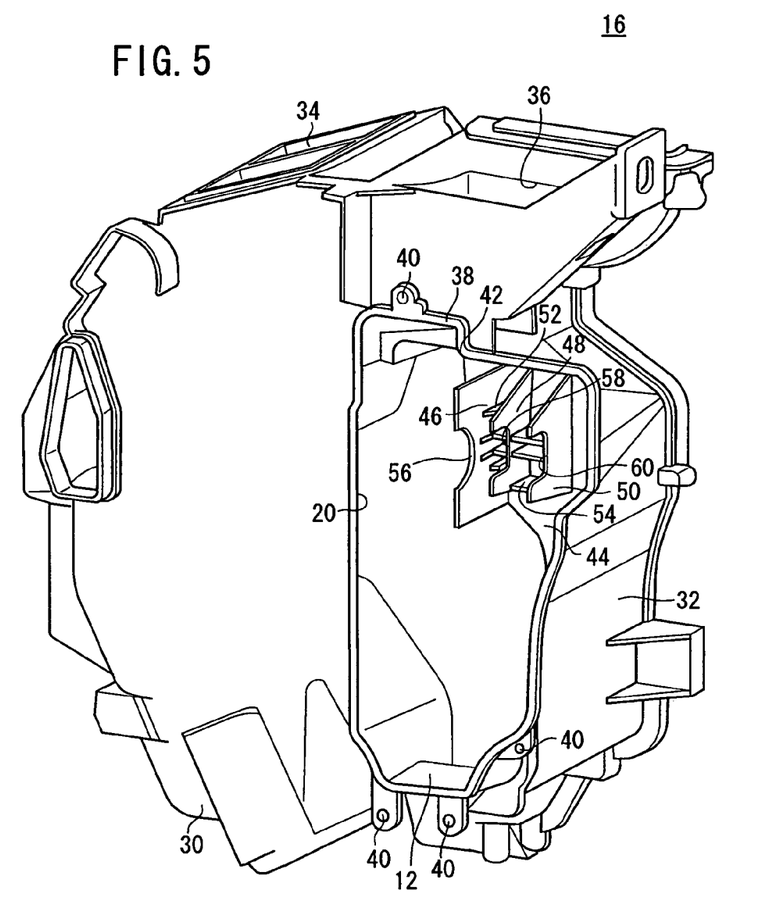
FIG. 5 is a perspective view of the first casing shown in FIG. 1.

As shown in FIG. 5, a partition wall 44 extends obliquely from an upper portion of the opening 20, where the step 42 is positioned, to a position beneath a right wall of the evaporator housing 32, where the width of the opening 20 is relatively small. The partition wall 44 is located at a position so as not to conceal the evaporator 12 (see FIG. 1).

A first baffle plate 46, a first support plate 48, and a second support plate 50 project from an end face of the partition wall 44, and are successively arranged from the left in the order named, in parallel with each other (see FIG. 5). Stiffener ribs 52, 54 are interposed between the first baffle plate 46 and the first support plate 48, as well as between the first support plate 48 and the second support plate 50. As shown in FIG. 5, the first baffle plate 46 has a vertical dimension greater than that of the first support plate 48 and the second support plate 50.

The first baffle plate 46 has a substantially semicircular arcuate cavity 56 defined therein. The first support plate 48 and the second support plate 50 have substantially rectangular engaging recesses 58, 60 defined respectively therein. The engaging recesses 58, 60 have rounded corners. As shown in FIG. 1, the downstream joint 26 of the evaporation valve 14 engages within the arcuate cavity 56, whereas the upstream joint 28 engages within the engaging recesses 58, 60.

As shown in FIG. 2, the second casing 18 has an opening 62 therein, which is surrounded by a fastening rib 64 of a predetermined dimension. The fastening rib 64 has a plurality of bolt holes 66 defined therein at spaced intervals in alignment with the respective bolt holes 40 in the fastening rib 38 of the first casing 16.

The second casing 18 also has a substantially elongate rectangular through hole 68 defined in an outer wall thereof that provides an exposed outer surface when the second casing 18 and the first casing 16 are coupled to each other. Accordingly, when the second casing 18 and the first casing 16 are coupled to each other, the evaporator 12 can be seen from the front side of the vehicular air conditioning unit 10 shown in FIGS. 1, 3, and 4 through the through hole 68.

The second casing 18 also has a housing chamber 70 disposed in an upper portion thereof, which bulges sufficiently so as to accommodate the expansion valve 14 therein. Specifically, the second casing 18 has a partition wall 72 and a second baffle plate 76 extending vertically to a horizontal portion 74 of the partition wall 72. The partition wall 72, the second baffle plate 76, and an inner surface of the outer wall of the second casing 18 jointly define the housing chamber 70. The second casing 18 also includes a liquid reservoir chamber 78 disposed beneath the housing chamber 70, which is defined jointly by the partition wall 72 and the inner surface of the outer wall of the second casing 18. Although not shown, the liquid reservoir chamber 78 includes a drain port.

Figure 6:
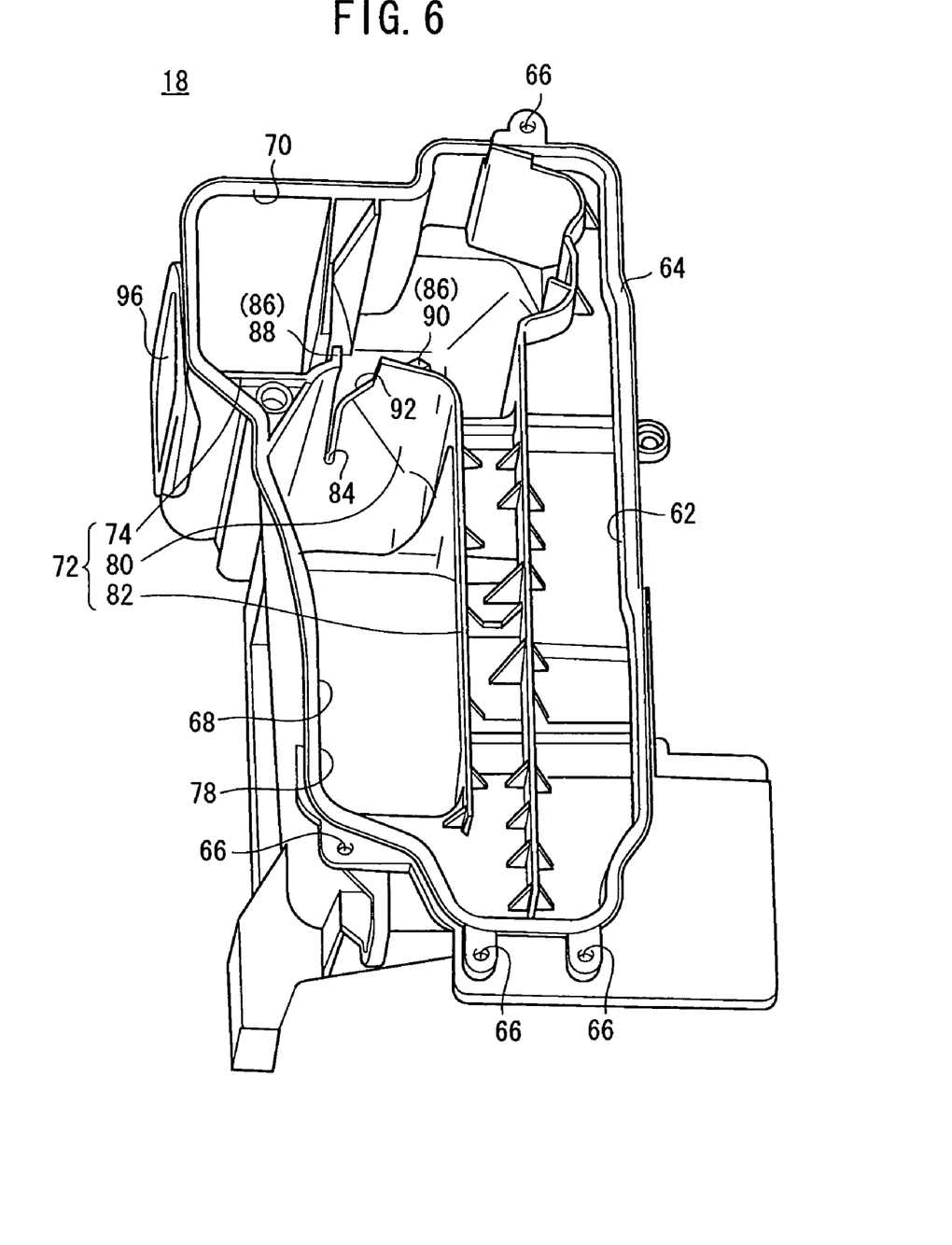
FIG. 6 is a perspective view of the second casing shown in FIG. 2, as viewed from a different angle.

The partition wall 72 includes the horizontal portion 74, extending from the left to the right as shown in FIG. 2, a slanted portion 80 extending obliquely downward from the horizontal portion 74, and a vertical portion 82 extending downward from the slanted portion 80. The slanted portion 80 is also slanted progressively slightly upwardly, in a direction away from the viewer as illustrated in FIG. 2. As shown in FIG. 6, which illustrates the second casing of FIG. 2 as viewed from a different angle, a slit 84 is provided, which defines a guide groove at the boundary between the horizontal portion 74 and the slanted portion 80.

An upstanding guide rib 86 is disposed on the horizontal portion 74 along the slit 84 in facing relation to the housing chamber 70. Specifically, the guide rib 86 is positioned near the boundary between the horizontal portion 74 and the slanted portion 80. The slit 84 extends all the way from the guide rib 86 to the partition wall 72.

As shown in FIG. 2, the guide rib 86 has an elongate shape extending along the depth of the housing chamber 70. The slit 84 extends along the depth of the housing chamber 70 from one end of the guide rib 86, which is closer to the viewer as shown in FIG. 2, to a position slightly beyond the midpoint of the guide rib 86. Near the end thereof, the guide rib 86 has a horizontal side wall 88 and a slanted side wall 90, which are spaced from each other and disposed in confronting relation to each other across the slit 84. The second baffle plate 76 is contiguous with the other end of the guide rib 86, which is disposed farthest away from the viewer as shown in FIG. 2.

The slanted side wall 90 is shorter than the horizontal side wall 88 along the depth of the housing chamber 70. The slanted portion 80 has a recess 92 defined therein, which is joined to the slit 84, and which is shaped so as to increase the transverse dimension or width of the opening of the slit 84 near the end of the side wall 90 (see FIGS. 2 and 6).

The second baffle plate 76 has a semicircular arcuate cavity 94 defined therein (see FIG. 2). As described later, the second baffle plate 76 is disposed in a position facing the first baffle plate 46. The downstream joint 26 of the expansion valve 14 engages within the arcuate cavities 56, 94. Therefore, the expansion valve 14 is encircled by the first baffle plate 46 and the second baffle plate 76.

The side wall of the housing chamber 70, which is positioned remotely from the second baffle plate 76, has an oblong hole 96 defined therein. A distal end of the upstream joint 28 of the expansion valve 14 faces the oblong hole 96. Stated otherwise, the distal end of the upstream joint 28 of the expansion valve 14 can be seen through the oblong hole 96.

When the second casing 18 is connected to the first casing 16, the evaporator 12 and the expansion valve 14 are disposed in their respective given positions. At this time, the downstream joint 26 of the expansion valve 14 engages within the arcuate cavity 56 in the first baffle plate 46, whereas the upstream joint 28 engages within the engaging recesses 58, 60 that are defined respectively in the first support plate 48 and the second support plate 50 (see FIG. 1).

Figure 7:
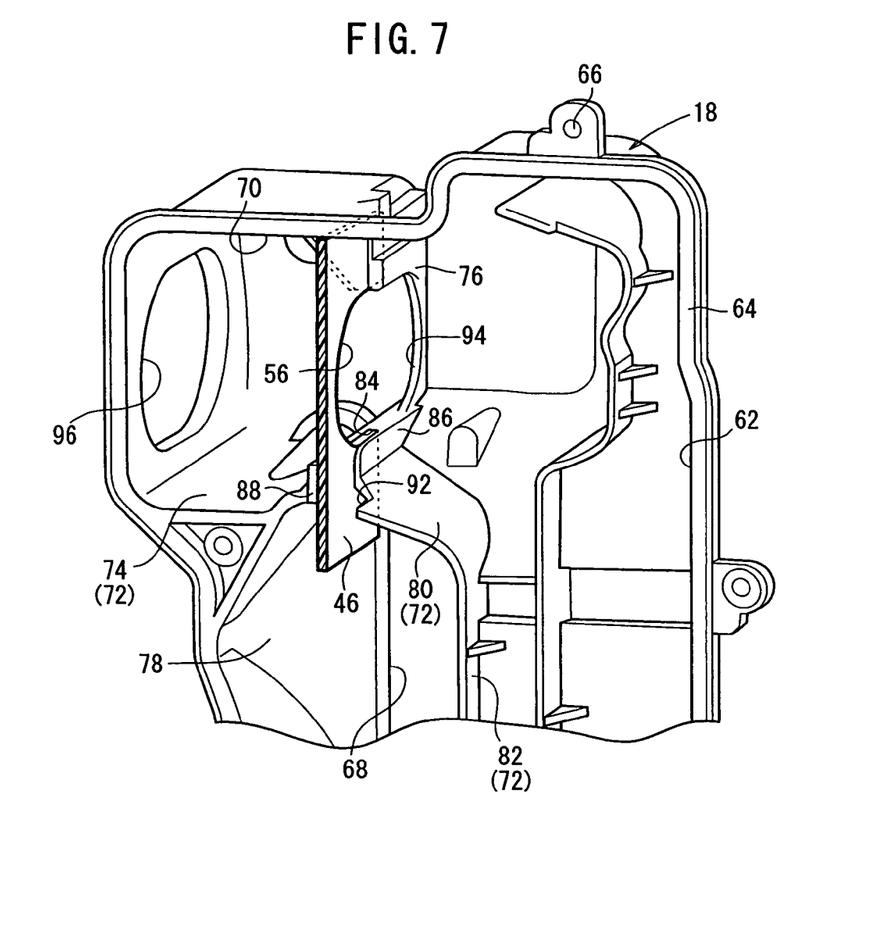
FIG. 7 is an enlarged fragmentary perspective view showing a first baffle plate that projects from a slit into a liquid reservoir chamber.

Thereafter, the opening 20 of the first casing 16 and the opening 62 of the second casing 18 are aligned with each other. The distal end of the first baffle plate 46 is inserted into the slit 84 in the second casing 18 (see FIG. 4). As shown in FIG. 7, the distal end of the first baffle plate 46 projects slightly from the slit 84. The first support plate 48 and the second support plate 50 have respective lower end faces, which are slidably positioned on an upper end face of the horizontal portion 74 of the partition wall 72 (see FIG. 4).

When the second casing 18 is moved so as to abut against the first casing 16, the downstream joint 26 of the evaporation valve 14 engages within the arcuate cavity 94 of the second baffle plate 76, and is encircled by the first baffle plate 46 and the second baffle plate 76. Since the downstream joint 26 is encircled by the first baffle plate 46 and the second baffle plate 76, and the upstream joint 28 engages with the first support plate 48 and the second support plate 50, the expansion valve 14, and hence both the low-pressure pipe 22 and the high-pressure pipe 24, are positioned thereby. Thereafter, bolts (not shown) are threaded into the bolt holes 40, 66 defined respectively in the first casing 16 and the second casing 18, thereby fastening the second casing 18 to the first casing 16.

As described above, the lower end of the first baffle plate 46 projects from the slit 84, so as to be positioned outside of the housing chamber 70 (see FIG. 7). The distal end face of the upstream joint 28 of the expansion valve 14 faces the oblong hole 96.

The vehicular air conditioning unit 10 according to the embodiment of the present invention is basically constructed as described above. Operations and advantages of the vehicular air conditioning unit 10 shall be described below.

The vehicular air conditioning unit 10, a compressor (not shown), a condenser (not shown), and a receiver (not shown) jointly make up a cooling mechanism, which is mounted in an automobile. When a passenger in the automobile starts to operate the cooling mechanism, a refrigerant is compressed by the compressor, and condensed by the condenser into a liquid phase. The refrigerant then flows through the receiver into the expansion valve 14, through a pipe that extends through the oblong hole 96, and which is connected to the expansion valve 14. The refrigerant then is ejected from the expansion valve 14 as a mist, which reaches the evaporator 12 and flows through an evaporator tube.

A blower unit (not shown) operates to introduce air from the passenger compartment of the automobile, or from outside of the automobile, into contact with the evaporator 12. The introduced air is cooled as a result of heat exchange with the refrigerant flowing through the tube of the evaporator 12. Thereafter, cooled air is discharged from at least one of the outlet ports 34, 36 into the passenger compartment.

While the air is being cooled, the expansion valve 14 causes adiabatic expansion in the vicinity of the downstream joint 26, causing liquid droplets to form on the downstream joint 26, the low-pressure pipe 22, and the high-pressure pipe 24, as a result of dew condensation. Since air is introduced into the first casing 16 by the blower unit, the liquid droplets move toward the first baffle plate 46 and the second baffle plate 76.

Because the first baffle plate 46 is slidably inserted in the slit 84, a small clearance exists between the first baffle plate 46 and the slit 84. Therefore, air flows through the slit 84 into the liquid reservoir chamber 78, which is defined jointly by the vertical portion 82 and the inner surface of the outer wall of the second casing 18, and liquid droplets accompanying the air also flow into the liquid reservoir chamber 78.

The liquid droplets, which come into contact with the first baffle plate 46 and the second baffle plate 76, are guided to the slit 84 and then enter into the liquid reservoir chamber 78 through the clearance between the first baffle plate 46 and the slit 84. The liquid droplets, which come into contact with the slanted side wall 90 of the guide rib 86, are guided by the slanted side wall 90 and drop through the recess 92 into the liquid reservoir chamber 78, since the slanted portion 80 is slanted downwardly toward the recess 92. The liquid droplets, which flow from the downstream joint 26 of the expansion valve 14, also are guided by the first baffle plate 46 and the second baffle plate 76, and finally are guided through the slit 84 into the liquid reservoir chamber 78.

When the liquid droplets are guided through the recess 92 and into the liquid reservoir chamber 78, since the first baffle plate 46 projects from the slit 84 into the liquid reservoir chamber 78 (see FIG. 7), the liquid droplets are prevented from moving into the housing chamber 70. Therefore, the liquid droplets are efficiently trapped within the liquid reservoir chamber 78. The trapped liquid droplets are discharged out of the second casing 18 through an unillustrated drain port or via the through hole 68.

According to the present embodiment, as described above, liquid droplets produced by dew condensation are blocked by the first baffle plate 46 and the second baffle plate 76, and are guided by the first baffle plate 46, the second baffle plate 76 and the guide rib 86 to the slit 84, whereupon the liquid droplets are introduced into the liquid reservoir chamber 78 in the second casing 18. Therefore, liquid droplets are prevented from entering the passenger compartment and causing passengers to become wet.

Furthermore, even when dew condensation occurs on the low-pressure pipe 22 and the high-pressure pipe 24, since the liquid droplets produced on the pipes 22, 24 are guided to the drain port, it is not necessary to provide an insulator wound around the low-pressure pipe 22 and the high-pressure pipe 24, in order to prevent dew condensation from occurring thereon. Accordingly, the vehicular air conditioning unit 10 can be manufactured efficiently, since the process of winding an insulator is not required. Further, since an insulator is not required, the number of parts used is relatively small, and the vehicular air conditioning unit 10 can be manufactured at a relatively low cost.

Figure 8:
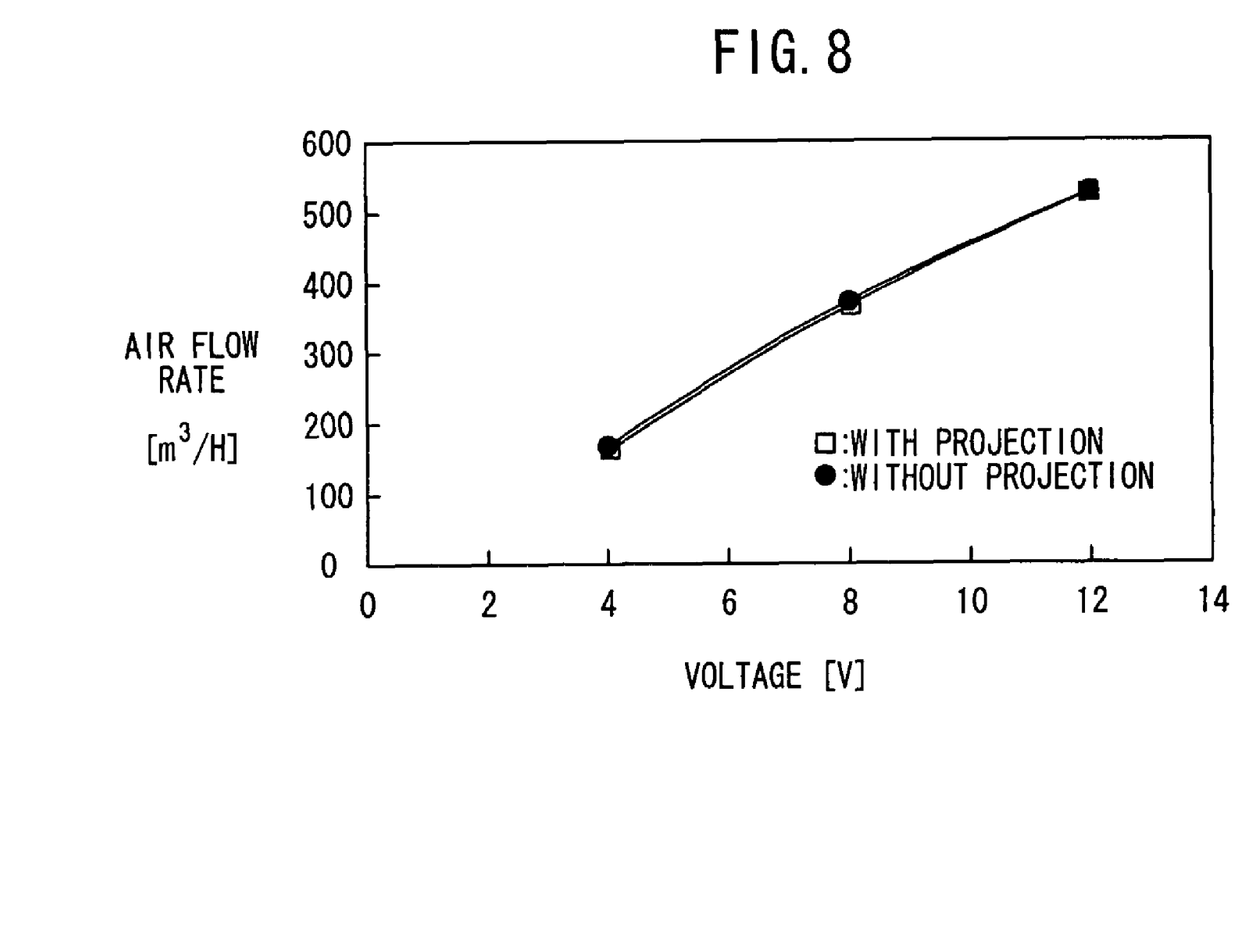
FIG. 8 is a graph showing the relationship between voltages applied to a blower unit and air flow rates, when the first baffle plate projects into the liquid reservoir chamber (as indicated by the curve plotted by points □), and when the first baffle plate does not project into the liquid reservoir chamber (as indicated by the curve plotted by points ●).

FIG. 8 is a graph showing how the air flow rate changes when the first baffle plate 46 projects into the liquid reservoir chamber 78 (as indicated by the curve plotted by points □), as well as when the first baffle plate 46 does not project into the liquid reservoir chamber 78, but has its lower end lying flush with the slit 84 (as indicated by the curve plotted by points ●). In FIG. 8, the horizontal axis represents voltages applied to the blower unit.

As can be seen from FIG. 8, the curve represented by points □ and the curve represented by points ● are essentially in agreement with each other. This means that even though the first baffle plate 46 projects slightly into the liquid reservoir chamber 78, the air resistance does not change, and no difference in the capability of the vehicular air conditioning unit 10 is caused.

In the above embodiment, the slit 84 is defined in the second casing 18, and the first baffle plate 46 disposed in the first casing 16 is inserted in the slit 84. However, alternatively, the slit 84 may be defined in the first casing 16 near the first baffle plate 46, with the second baffle plate 76 disposed in the second casing 18 being inserted in the slit 84.

If necessary, the expansion valve 14 may be covered with a jacket made of a sponge or the like.

Although a preferred embodiment of the present invention has been shown and described in detail, it should be understood that various changes and modifications may be made to the invention without departing from the scope thereof as set forth in the appended claims.

What is claimed is:

1. A vehicular air conditioning unit mounted on an automobile, for adjusting the temperature of air in a passenger compartment of the automobile, comprising:

an evaporator;

an expansion valve connected by pipes to said evaporator;

a first casing accommodating said evaporator therein and having a first baffle plate; and a second casing having a second baffle plate disposed in a position that faces said first baffle plate when said second casing is connected to said first casing;

said first casing having a guide groove defined therein for slidable insertion of said second baffle plate therein, wherein, when said second casing is connected to said first casing, said second baffle plate is slidably inserted in said guide groove, and said expansion valve is encircled by said first baffle plate and said second baffle plate, and wherein, when dew condensation occurs on said pipes, liquid droplets produced on said pipes are blocked by said first baffle plate and said second baffle plate, and said liquid droplets are caused to pass through said guide groove.

2. A vehicular air conditioning unit according to claim 1, further comprising an upstanding guide rib disposed near an opening of said guide groove for guiding said liquid droplets toward said guide groove, said guide rib having two walls held in abutment against respective end faces of said first baffle plate and said second baffle plate, while gripping one of said first baffle plate and said second baffle plate.

3. A vehicular air conditioning unit according to claim 2, wherein one of said two walls of said guide rib is shorter than the other of said two walls, and said guide groove has an increased width at an end of said shorter wall.

4. A vehicular air conditioning unit according to claim 1, wherein one of said first baffle plate and said second baffle plate has a distal end that projects from said guide groove.

5. A vehicular air conditioning unit according to claim 4, wherein said distal end that projects from said guide groove produces an air resistance, which is essentially the same as an air resistance that would be produced by said distal end if said distal end did not project from said guide groove.

6. A vehicular air conditioning unit mounted on an automobile, for adjusting the temperature of air in a passenger compartment of the automobile, comprising:
   an evaporator;
   an expansion valve connected by pipes to said evaporator;
   a first casing accommodating said evaporator therein and having a first baffle plate; and
   a second casing having a second baffle plate disposed in a position that faces said first baffle plate when said second casing is connected to said first casing;
   said second casing having a guide groove defined therein for slidable insertion of said first baffle plate therein,
   wherein, when said second casing is connected to said first casing, said first baffle plate is slidably inserted in said guide groove of said second casing, and said expansion valve is encircled by said first baffle plate and said second baffle plate, and
   wherein, when dew condensation occurs, liquid droplets produced on said pipes are blocked by said first baffle plate and said second baffle plate, and said liquid droplets are caused to pass through said guide groove.

7. A vehicular air conditioning unit according to claim 6, further comprising an upstanding guide rib disposed near an opening of said guide groove for guiding said liquid droplets toward said guide groove, said guide rib having two walls held in abutment against respective end faces of said first baffle plate and said second baffle plate, while gripping one of said first baffle plate and said second baffle plate.

8. A vehicular air conditioning unit according to claim 7, wherein one of said two walls of said guide rib is shorter than the other of said two walls, and said guide groove has an increased width at an end of said shorter wall.

9. A vehicular air conditioning unit according to claim 6, wherein one of said first baffle plate and said second baffle plate has a distal end that projects from said guide groove.

10. A vehicular air conditioning unit according to claim 9, wherein said distal end that projects from said guide groove produces an air resistance, which is essentially the same as an air resistance that would be produced by said distal end if said distal end did not project from said guide groove.

* * * * *